United States Patent Office 3,668,011
Patented June 6, 1972

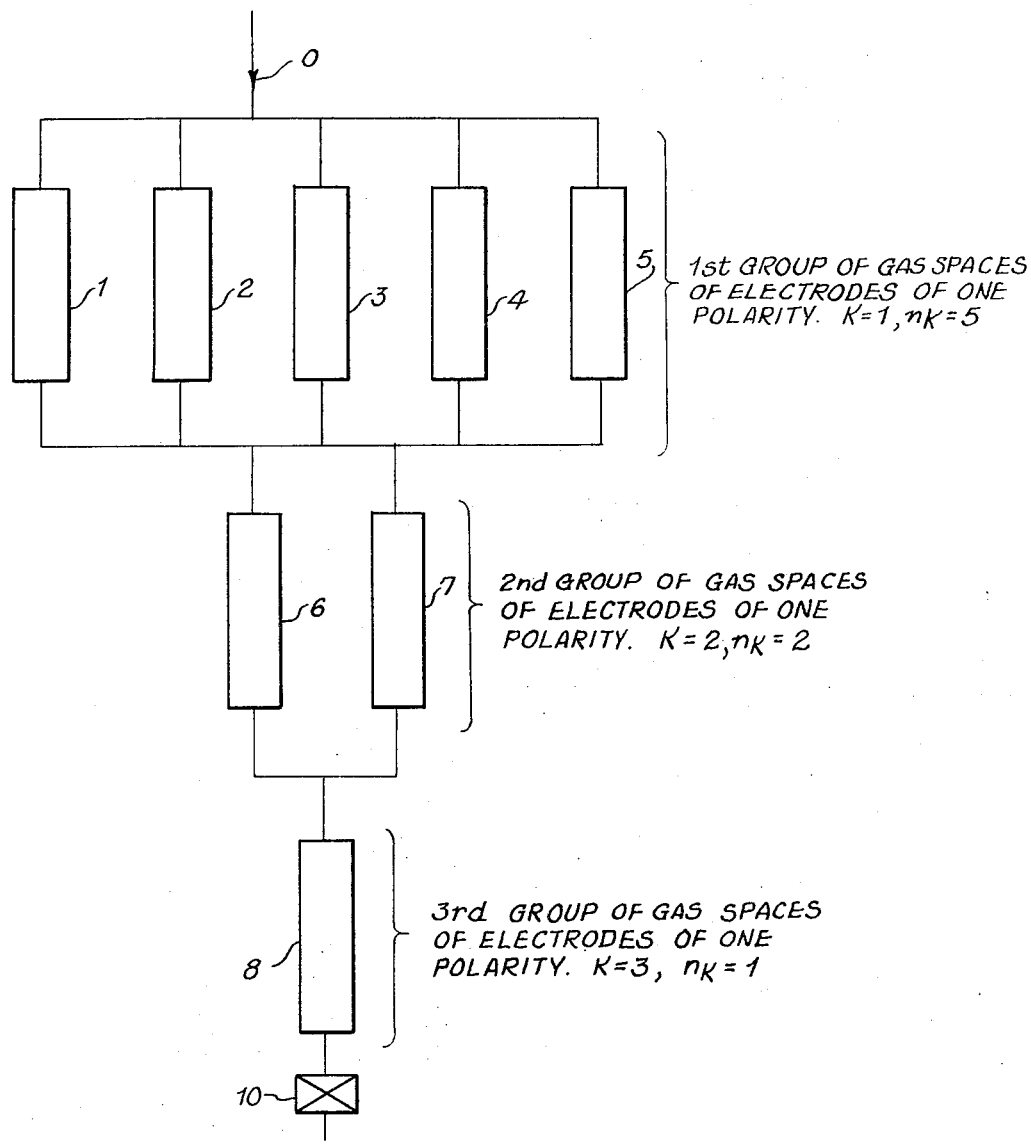

3,668,011
GALVANIC CELL BATTERY WITH GAS DIFFUSION ELECTRODES
Horst Grune and August Winsel, Kelkheim, Germany, assignors to Varta Aktiengesellschaft, Frankfurt am Main, Germany
Filed Aug. 8, 1968, Ser. No. 751,097
Claims priority, application Germany, Aug. 19, 1967, V 34,280
Int. Cl. H01m 27/02
U.S. Cl. 136—86 R
11 Claims

ABSTRACT OF THE DISCLOSURE

Galvanic cell battery having a plurality of gas diffusion electrodes of one or both polarities wherein the gas chambers of all the electrodes of one polarity are arranged in a plurality of groups such that, with respect to the flow of operating gas through the gas chambers, all the gas chambers in one group thereof are connected in parallel with one another and all the groups of gas chambers of the electrodes of the same polarity are connected together in series with one another and the number of gas chambers in the respective groups decreases continuously from the first to the last of the series of groups.

BACKGROUND OF THE INVENTION

(1) Field of the invention

The invention relates to galvanic cell batteries, such as fuel cell batteries, which employ gas diffusion electrodes therein.

DESCRIPTION OF THE PRIOR ART

In order to utilize the advantages of mass production of electrodes, a galvanic battery, such as a fuel cell battery, always consists of a large number of anodes and cathodes of the same size and shape which are connected electrically in parallel and/or in series. In a fuel cell battery which is employed for the production of electrical energy by the oxidation of gaseous fuels there are preferably used, as the anodes, gas diffusion electrodes. Correspondingly, gas diffusion electrodes are also preferably used as cathodes for the electrochemical conversion of gaseous oxidizing agents.

Porous gas diffusion electrodes are bodies in the pores of which the gas phase and the electrolyte phase simultaneously come in contact with the catalyst material which is contained in the bodies of the electrodes, so that the components of these phases can form ions during the exchange of electrons with the electron conducting electrode body. A gas diffusion electrode of this type may be inserted as a separating wall between the electrolyte chamber and the gas chamber. The gas chamber can also be formed by a coherent part of the pore system which traverses the electrode. In the course of time a series of different types of gas diffusion electrodes have been devised, which have structures which are based on the above disclosed concepts and possess the disclosed characteristics and which are fully described in the pertinent literature. Reference may be made in this regard to the description of such electrodes by, for example, E. Justi and A. Winsel in "Kalte Verbrennung-Fuel Cells," ("Cool Combustion-Fuel Cells") Steiner-Verlag, Wiesbaden, 1962; and by W. Vielstich in "Brennstoffelemente" ("Fuel Cell Elements"), Verlag Chemie, Weinheim, 1965.

In German patents, 1,146,563 and 1,187,697, which correspond to British Patents 949,802 and 1,019,630 respectively, it has been proposed that the removal of inert gas from fuel cell batteries, in which the gas chambers of the electrodes having the same polarity are connected in series, be controlled by the decrease of the power of the last electrode of the series. The inert constituents accumulate in this last electrode and the inert gas leads to a suffocation of the electrochemical reaction which takes place first in this electrode. Thus, if the electrodes are also electrically connected in series, then the polarization of the electrodes serves as the measure of control. If, however, the electrodes are connected electrically in parallel, then the drop in the electrode current of the last electrode in the set in this type of electrode arrangement is used to control the exhaust of the inert gas.

In British Patent 1,032,935 it has been further proposed the the removal of inert gas be regulated by using a special gas diffusion electrode as the control electrode. In these known fuel cell batteries, in which the gas chambers of all electrodes having the same polarity are connected in series with respect to the flow of gas, a very high pressure drop occurs when the battery operates under higher load conditions which require a correspondingly higher consumption of the reaction gases, if the individual gas chambers, which are connected in series, have too high a gas flow resistance.

SUMMARY OF THE INVENTION

An object of this invention, therefore, is to produce a galvanic cell battery which does not have the disadvantages of the prior art batteries and which will also assure an adequate supply of operating gas to the electrodes when the battery contains a large number of gas chambers and/or when the individual gas chambers exhibit a high resistance to the flow of gas therethrough.

Another object of this invention is to produce means for maintaining a sufficiently high flow of gas in the gas chambers of these batteries so that such flow of gas will aid in moving the inert gas to inert gas exhaust means.

Another object of this invention is to produce a battery which may be adapted to being operated with mixtures of gases which may contain the most varied combination of inert gas components.

A further object of this invention is to produce a battery which will make it possible, with a selected construction of such battery, to keep below a preselected reaction gas content in the last group of gas chambers, if the gas flow resistances of the gas chambers of the individual electrodes deviate to a relatively large degree, as can occur as a result of the manufacture of such electrodes by mass production techniques.

The essence of the present invention resides in producing a galvanic cell battery having gas diffusion electrodes in which gas chambers of electrodes of the same polarity and of the same type construction are connected together in individual groups of gas chambers, in each of which groups the gas chambers therein are connected in parallel with one another with respect to the flow of gas therethrough, and the individual groups of gas chambers, in turn, are arranged in series with one another with respect to the flow of gas therethrough, and the number of gas chambers in the groups which follow one another decreases.

The means by which the objects of this invention are obtained more fully with reference to the accompanying drawing which shows a block diagram of the battery of this invention.

The drawing shows an embodiment of the galvanic cell battery of this invention. Only the connection of the gas spaces or chambers of the electrodes of one polarity is shown; the electrodes of the other polarity, the electrolyte spaces, battery casing and electrical connections of electrodes do not form a part of this invention; they have been omitted for the sake of clarity. The battery as shown has three groups of gas spaces connected in series and the distribution of gas spaces among the groups corresponds to the case of $N=3$ and $\alpha=0.1$ approximately in following Table I. The gas mixture containing reaction gas and the inert gas is supplied to the battery at point O. The first group contains the gas spaces 1 to 5 and the second group the two spaces 6 and 7. The third group has a single gas space 8 and at the outlet of space 8 a venting valve 10 for venting the residual gas mixture is connected.

DESCRIPTION OF THE PREFERRED EMBODIMENT

In the batteries of the present invention the gas diffusion electrodes are formed, with respect to the arrangement of their gas chambers, into N groups of parallel connected gas diffusion electrodes. The first group, consisting of $n_1$ parallel connected gas chambers, is supplied with the operating gas first. The second group consists of $n_2$ gas chambers and it draws gas from the first group. Finally, the last group, number N in the series of groups, has $n_n$ parallel connected gas chambers. The inert impurities in the operating gas are vented continuously or discontinuously from this last group through a valve. Due to this arrangement of the gas chambers the gas which is used in the group number K having $n_k$ electrodes must first flow through the gas chambers of the electrodes in each of the groups numbered 1 to K-1.

A pressure differential and a resulting gas flow are generated between the inlet and the exhaust points of the gas spaces of the electrodes of one polarity. This effect may be explained as follows. A single porous gas diffusion electrode is described first. The electrode is a flat shaped porous disk, which on one side is in contact with electrolyte. On the opposition side the pores of the electrode layer containing catalyst, also called a working layer, are in contact with reaction gas. A gas space, for example, a porous gas distribution layer is situated on this side. The edges of the disk are impermeable to gases or liquids with the exception of one more area in the gas distribution layer, which may also be the working layer, where gas inlet and in most cases also gas outlets are connected. In the latter cases gas enters at the gas inlet. Part of the gas is electrochemically reacted at the electrode, and the residual gas leaves at the gas outlet. The gas is electrochemically reacted within the pores of the working layer; these pores therefore behave like holes, into which reaction gas disappears. The electrochemical reaction is dependent on the electrical load on the fuel cell element, of which the electrode in question is a part. Let us consider the case of an electrode with only a gas inlet or a temporarily closed gas outlet. The inlet is connected to a gas supply with supply pressure $P_s$, while the electrode is not connected to an electrical load. The gas spaced fills with reaction gas at pressure $p_s$. Now the electrical load is switched on. Reaction gas disappears into the holes and therefore the gas pressure in the gas space is momentarily reduced. The resultant pressure differential causes gas flow from the gas supply into the gas space. The zones of the space most distant from the inlet are supplied with fresh gas flowing through the remainder of the gas space. The electrochemical reaction continuously creates a pressure differential and therefore a continuous flow of gas through the gas space. Similar considerations apply if the gas space of a second electrode is connected to the gas outlet of the first electrode. The pressure differential created along the distance between gas inlet and outlet by the electrochemical reaction is even more enhanced, if the reaction gas is supplied mixed with an inert gas, since then a larger portion of the gas mixture is consumed by the reaction and a larger change in volume and therefore in pressure takes place. This effect increases as the gas passes along the electrode between gas inlet and outlet.

There is thus generated a flow of gas in the gas chambers of each group by means of which the inert constituents of the gas are transported from group to group. Thus, during the operation of the battery the inert constituents eventually collect in the $n_n$ gas chambers of group N, so that it is here that the suffocation of the electrode reaction first occurs. With the formation of the cushion of inert gas in the last group of electrodes the output of the individual electrodes in this group N decreases in comparison to the outputs of the individual electrodes of the preceding group N-1. This drop in output in the last group of electrodes can be used for controlling, in a continuous or discontinuous way, the exhaust of the inert gas, whereby the decrease in output is made perceptible as a decrease in electrical current when the electrodes of group N are electrically connected in parallel to an electrical sensing device for controlling valve 10 and as a decrease in voltage when they are electrically connected in series.

By reason of the parallel connections of the gas chambers in each group the effective gas flow resistance is lowered and the use of a large number of electrodes in the battery is made possible without increasing the operating gas pressure. In addition, electrodes can be used which have gas chambers which have a relatively high gas flow resistance.

By means of the parallel connecting of the gas chambers of one group the influence of the high gas flow resistance of the gas chamber of a single electrode is substantially lessened.

The series connecting of the individual groups of gas chambers leads to an increase in the inert gas portion of the operating gas during the course of the flow of the operating gas through the groups of gas chambers.

The number of the gas chambers in the groups decreases in the direction of the flow of gas. In this way it can be always achieved that a sufficiently high gas flow velocity is attained in the individual gas chambers, even though the total amount of gas flowing through the groups of gas chambers in a given period of time is decreased by the electrochemical reaction in the previous groups of gas chambers.

In an advantageous embodiment of the batteries of this invention the last group of gas chambers consists of gas chambers which are coordinated to the electrodes of a galvanic cell, where the electrodes are connected electrically in parallel. In this instance the inert gas concentration effects a decrease in the voltage of this cell.

Electrodes which are suitable for the batteries of the present invention include porous gas diffusion electrodes as well as non-porous diffusion electrodes, in which, for example, hydrogen diffuses through a palladium membrane or a palladium/silver membrane, which contacts the operating gas on one side of the electrolyte on the other side.

The gas chambers of the porous or non-porous electrodes can be formed by an open area or by an area which is filled with metal wool, or a coarse powdery metallic or ceramic material, in order to provide for a better intermixing of the gases.

It is preferable to use porous gas diffusion electrodes for the batteries of this invention in which the gas chamber is formed by a coarse pored layer which is adjacent to the fine pored catalyst layer, or by an interconnected or coherent system of coarser pores.

In an advantageous form of the galvanic cell battery of this invention the last group of gas chambers of the electrodes consists of a single cell, wherein the electrodes are connected together electrically in parallel. The electrical output of this cell is then determined by the inert gas concentration of this cell and thus such output can be used for controlling the exhaust of the inert gas. In a particularly simple form of a battery of this invention the last group of gas chambers is formed by the gas chamber of a single electrode.

In a particularly advantageous embodiment of the batteries of this invention the gas chambers of the electrodes of the last group are provided with gas blow off means such as a blow off valve for the exhaust of the gas impurities. The operation of the blow off valve is controlled by conventional means by the electrical output of the electrodes of this last group of electrodes.

In the mass production of electrodes it is not possible, without great expense, to manufacture the electrodes so as to maintain the gas flow resistance characteristics of the individual electrodes within very close tolerances. This leads to the situation, when the gas chambers of a group of electrodes are connected in parallel with respect to the gas flow therethrough, and they contain, for example, a gas chamber having a higher gas flow resistance, that a larger amount of gas flows through the gas chambers of the other electrodes, on the average, than is reacted therein. In one group of gas chambers the possible decrease in reaction gas content, therefore, is so much the less, the greater is the difference in the gas flow resistance of the electrodes of the group. If one desires to keep below a fixed content of reaction gas in the exhaust gas or a determined loss factor $\gamma$ with a higher variation of the gas flow resistance of the separate electrodes, then the number of groups of gas chambers connected in parallel must be chosen correspondingly high. The loss factor $\gamma$ is defined as the ratio of the amount of reaction gas in the exhaust gas to the amount of the reaction gas supplied to the fuel cell battery and this loss factor is to be kept as low as possible.

According to what has been disclosed herein the number of required groups of gas chambers required as well as the distribution of the total number of gas chambers of the battery among the groups of gas chambers is determined by a combination of the given variation of the gas flow resistances of the gas chambers, the reaction gas content by volume $X_o$ in the starting gas mixture and the loss factor $\gamma$. In the following examples of embodiments of batteries of this invention it was assumed that the largest existing gas flow resistance of the gas chambers was twice as large as the average gas flow resistance in such gas chambers and the batteries were operated with technical grade gases ($x_0=99\%$). If the gas chambers of all of the same type of electrodes of these batteries were connected in parallel according to the common prior art, then a reaction gas content of 97% by volume in the exhaust gas would be obtained with an attendant loss factor $\gamma$ of 33% if a breakdown of the battery voltage by suffocation was to be avoided.

The following examples are only illustrative of this invention and are not intended as a limitation upon the scope thereof.

Example 1.—Of the 360 gas chambers of the anodes of a fuel cell battery, 270 gas chambers which were formed by a porous layer were connected together in parallel with respect to the flow of gas therethrough in a first group, and 90 gas chambers were connected together in parallel with respect to the flow of gas therethrough in a second group, and the two groups were then connected in series with respect to the flow of gas therethrough. Using this arrangement a reaction gas content of 92% by volume in the exhaust gas was attained when the initial reaction gas content of the technical grade gas supplied was 99% by volume. This corresponded to a loss factor of $\gamma=12\%$. The operating gas used in the anodes was hydrogen. Each of the anodes measured approximately 115 mm. x 163 mm. x 3 mm. and they all contained Raney-nickel as a catalyst. During the test operation the battery was operated under a load of 50 ma./cm.². The oxidant used in the cathodes was oxygen and the electrolyte employed in the battery was 6 n KOH. The anodes and cathodes were connected together electrically in series.

Example 2.—The gas chambers of the 400 cathodes of a fuel cell battery were divided into three individual groups of gas chambers. The first group contained 280 gas chambers and the third group contained 30 gas chambers. The gas chambers in each group were connected together in parallel, and the three groups were connected in series, with respect to the flow of gas therethrough. An initial reaction gas content of about 94% by volume could be decreased to 81% in the exhaust gas which corresponds to a loss factor of $\gamma=4.8\%$. The operating gas used in the cathodes was oxygen. Each of the cathodes measured approximately 115 mm. x 163 mm. x 3 mm. and they all contained silver as a catalyst. During the test operation the battery was operated under a load of 150 ma./cm.². The fuel used in the anodes was hydrogen and the electrolyte used in the battery was 6 n KOH. The anodes and electrodes were connected together electrically in parallel.

EXAMPLE 3

The gas chambers of 600 hydrogen diffusion electrodes of a fuel cell battery of the present invention were placed in four groups. The gas chambers in each of the groups were connected together in parallel, and then the individual groups were connected with one another in series with respect to the flow of the hydrogen gas therethrough. The number of gas chambers in the individual groups was fixed in a monotonously decreasing manner. The first group of gas chambers located at the hydrogen gas inlet side of the battery consisted of 412 parallel connected gas chambers, and there followed one after another, a second group of 130 gas chambers, a third group of 45 gas chambers and a fourth group of 13 gas chambers. The operating gas used in these electrodes was a mixture of 99% hydrogen gas and 1% inert gas, chiefly nitrogen. The gas mixture exhausted at the gas outlet positioned in the fourth or last group of hydrogen electrodes had a lowered hydrogen gas content of about 61% by volume which corresponded to a loss factor of $\gamma=1.6\%$. The hydrogen electrodes each measured approximately 115 mm. x 163 mm. x 3 mm. and they all contained Raney nickel as a catalyst. As the oxygen electrodes in this battery there were also used porous diffusion electrodes and the gas chambers of the hydrogen and oxygen electrodes all consisted of a porous layer with a variation in the gas flow resistance of 50%.

There was used as the operating gas for the oxygen electrodes a mixture of oxygen and 1% inert gas. The gas chambers of the oxygen electrodes were divided into three groups. The first group contained 480 gas chambers, the second group contained 102 gas chambers and the third group contained 18 gas chambers. Each of the oxygen electrodes measured approximately 115 mm. x 163 mm. x 3 mm. and contained silver as a catalyst. The oxygen gas mixture in the last group in the battery during the operation of the battery was lowered to a residual oxygen content of 45% which corresponded to a loss factor of 1%. The battery was operated under a load of 50 ma./cm.² during the test operation using 6 n KOH as the electrolyte.

In general, the number of individual gas chambers in one of the groups thereof can be so selected, that in all of the groups the same pressure drop is attained during the operation of the cell under an electrical load. The stipulated equal pressure drop is then attained for equal gas flow resistances of the individual electrodes if the number of the electrodes in one group corresponds to the scheme shown in the following Table I.

TABLE I

| $\alpha$ | | 0.01 | 0.02 | 0.05 | 0.1 | 0.2 | 0.5 | 5 |
|---|---|---|---|---|---|---|---|---|
| N=2 | K=2 | 9 | 12 | 18 | 23 | 29 | 37 | 48 |
| N=3 | K=3 | 3.7 | 5.4 | 9 | 12 | 16 | 22 | 31 |
|  | K=2 | 17.0 | 20.0 | 24 | 27 | 30 | 32 | 33 |
|  | K=4 | 2.2 | 3.4 | 5.6 | 8 | 11 | 16 | 23 |
| N=4 | K=3 | 7.0 | 9.0 | 12.0 | 15 | 18 | 21 | 24 |
|  | K=2 | 22.0 | 24.0 | 25.0 | 28 | 28 | 27 | 26 |

In Table I the number of the gas chambers $n_k$ in the individual groups is shown as a percentage of the total number of gas chambers $\Sigma_i M_k$ in the battery. The factor $\alpha$ is obtained when the amount of gas vented at the exhaust is divided by the amount of gas which is electrochemically converted.

N is the number of groups of gas spaces of electrodes of one polarity in the battery K is the group number $n_k$ is the number of gas spaces contained in group number K.

The specific number of electrode elements to be used in the individual groups of electrodes in the batteries of the present invention may be obtained from Table I. There is a certain degree of freedom which can be employed in this regard in order to be able to meet the exigencies of a given situation, as may arise for example due to the fact that the inert gas content of the reaction gas which is supplied to the battery can be variable. For maximum safety of operation of the battery, the highest inert gas content is used when $\alpha$ is calculated.

The inert gas content of commercially available oxygen is about 0.5%. In this case the number of groups of oxygen electrodes can be large so that they form a pointed pyramid, that means the number of groups is relatively large as compared to the number of gas spaces in the first group. If, however, instead of commercial grade oxygen, air is used as the operating gas for the oxygen electrodes, then only a small number of groups of gas spaces are to be used because of the preponderant nitrogen content of the air, since in the electrodes of a pointed pyramid type arrangement with a large number of groups of gas spaces, the gas flow velocity in the last group of gas spaces would have to be unusually great, in order to supply enough reaction gas.

Due to the fact that each galvanic cell consists of two sets of electrodes coupled together galvanically by the electrolyte and that the current density-polarization behavior of such sets of electrodes can only be measured with respect to each other, the present invention is useful for all batteries in which gas diffusion electrodes are used as anodes or cathodes. In this connection it is possible to mention the amalgam/oxygen cell or amalgam/air cell, in which the chemical energy of a potassium amalgam is retrieved by chloralkali electrolysis.

Another example of a device which may be employed in accordance with the present invention is an electrodialysis cell in which an electrodialysis reaction is conducted between a hydrogen diffusion anode and a hydrogen valve cathode through an ion exchange membrane or another diaphragm. Also in batteries of this type of electrodialysis cells the hydrogen anodes are arranged in groups in accordance with the present invention in order to regulate the exhaust of the inert gas.

As another example of the types of devices which can be used in accordance with the present invention there can be mentioned purification cells. Thus, in these type devices, pure oxygen at the anodes and nitrogen at the cathodes can be produced when electrical energy is supplied to air cathodes and oxygen anodes in such devices.

In order to assure a secure operation of the air cathodes and to assure the best possible utilization of the oxygen in the air in such devices, the air cathodes are arranged in groups in accordance with the present invention. The specifications of Table I can be used for selecting the appropriate arrangement of gas diffusion electrodes of this type into groups in accordance with the present invention.

The use of the present invention is not limited to any particular temperature range. The present invention may be used with cells which operate at room temperature with aqueous electrolytes as well as with cells which operate at moderately elevated temperatures with molten salt electrolytes. The present invention may also be used with fuel cells in which the electrolyte consists of a solid ion conductor.

It has been shown by Baucke and Winsel, Advanced Energy Conversion 3,613 (1963), that there are optimum forms of electrodes to be used for the reaction of inert gas containing reaction gases, which forms are characterized in that in such electrodes the path that the operating gas must traverse between the gas inlet opening and the gas exhaust opening is everywhere of equal length. The present invention may be conveniently used with electrodes having these optimum forms as well as with electrodes which do not have such optimum forms.

We claim:

1. A galvanic cell battery comprising a plurality of gas diffusion electrodes of at least one polarity including gas chambers providing for gas passage through said electrodes, wherein the gas chamber of all the gas diffusion electrodes of said polarity are arranged in a plurality of groups of such gas chambers, a gas supply line for providing a mixture of operating and inert gases to a first group of said electrodes, a vent means to discharge gas from a last group of said electrodes, all the gas chambers in each group being connected in parallel with one another with respect to the flow of gas therethrough, all the groups of gas chambers being connected in series with the other groups with respect to the flow of gas therethrough, and the number of gas diffusion electrodes in the respective groups decreasing from the first group receiving gas from said gas supply line to the last of the group of the series connected to said vent means.

2. A galvanic cell battery as in claim 1 wherein the last group of electrodes of the series consists of an individual cell wherein the electrodes of such cell are connected together electrically in parallel to a control means.

3. A galvanic cell battery as in claim 1 wherein the last group of the series of groups of gas chambers consists of the gas chamber of an individual electrode.

4. A galvanic cell battery as in claim 1 wherein the individual gas chambers are formed by a coherent system of course pores in porous gas diffusion electrodes.

5. A galvanic cell battery as in claim 1 wherein the last group of the series of groups of gas chambers is equipped with gas venting means adapted to exhaust gas impurities from such last group in response to the decrease electrical power of the electrodes in such last group.

6. A galvanic cell battery as in claim 1 wherein all the anode electrodes are gas diffusion electrodes and the gas chambers therein are arranged in said plurality of groups.

7. A galvanic cell battery as in claim 1 wherein all the cathode electrodes are gas diffusion electrodes and all the gas chambers therein are arranged in said plurality of groups.

8. A galvanic cell battery as in claim 1 wherein all the electrodes of both polarities are gas diffusion electrodes and the gas chambers of the electrodes of both polarities are arranged in said plurality of groups.

9. A galvanic cell battery as in claim 1 wherein all the gas diffusion electrodes of one polarity are of approximately the same dimension and composition.

10. A galvanic cell battery as in claim 1 which is a fuel cell battery.

11. A galvanic cell battery as in claim 1 in which the arrangement of the plurality of groups of gas chambers follows the scheme

| $\alpha$ | | 0.01 | 0.02 | 0.05 | 0.1 | 0.2 | 0.5 | 5 |
|---|---|---|---|---|---|---|---|---|
| N=2 | K=2 | 9 | 12 | 18 | 23 | 29 | 37 | 48 |
| N=3 | K=3 | 3.7 | 5.4 | 9 | 12 | 16 | 22 | 31 |
|  | K=2 | 17.0 | 20.0 | 24 | 27 | 30 | 32 | 33 |
| N=4 | K=4 | 2.2 | 3.4 | 5.6 | 8 | 11 | 16 | 23 |
|  | K=3 | 7.0 | 9.0 | 12.0 | 15 | 18 | 21 | 24 |
|  | K=2 | 22.0 | 24.0 | 25.0 | 28 | 28 | 27 | 26 | in which the number of the gas chambers $n_k$ in the individual groups in a percentage of the total number of gas chamber $\Sigma_1 M_k$ in the battery, the factor $\alpha$ is the amount of gas vented at the exhaust divided by the amount of gas which is electrochemically converted, N is the number of groups of gas spaces of electrodes of one polarity in the battery K is the group number $n_k$ is the number of gas spaces contained in group number K.

References Cited

UNITED STATES PATENTS

| 2,694,680 | 11/1954 | Katz et al. | 204—301 X |
| 2,969,315 | 1/1961 | Bacon | 136—86 X |
| 3,256,116 | 6/1966 | Justi et al. | 136—86 |
| 3,311,507 | 3/1967 | Dittmann et al. | 136—86 X |
| 3,124,520 | 3/1964 | Juda | 204—129 UX |
| 3,306,832 | 2/1967 | Lewis et al. | 204—129 X |
| 3,462,351 | 8/1969 | Grangaard | 204—301 UX |

ALLEN B. CURTIS, Primary Examiner

U.S. Cl. X.R.

204—270, 301